United States Patent

Gautier et al.

[11] Patent Number: 5,711,152
[45] Date of Patent: Jan. 27, 1998

[54] BOOSTED BRAKING DEVICE WITH SIMPLIFIED AUTOMATIC CONTROL

[75] Inventors: Jean Pierre Gautier; Ulysse Verbo, both of Aulnay-Sous-Bois; Miguel Perez Revilla, Argenteuil, all of France

[73] Assignee: AlliedSignal Europe Services Techniques, Drancy, France

[21] Appl. No.: 204,247

[22] PCT Filed: Feb. 22, 1994

[86] PCT No.: PCT/FR94/00193

§ 371 Date: Mar. 7, 1994

§ 102(e) Date: Mar. 7, 1994

[87] PCT Pub. No.: WO94/20343

PCT Pub. Date: Sep. 15, 1994

[30] Foreign Application Priority Data

Mar. 10, 1993 [FR] France .................... 93 02743

[51] Int. Cl.⁶ .................... B60T 13/00; F15B 9/10
[52] U.S. Cl. .................... 60/547.1; 91/376 R
[58] Field of Search .................... 60/547.1; 91/369.1, 91/369.2, 376 R

[56] References Cited

U.S. PATENT DOCUMENTS

| | | | |
|---|---|---|---|
| 4,856,412 | 8/1989 | Kawasumi et al. | 91/376 R X |
| 4,966,420 | 10/1990 | Schiel et al. | 60/597.1 X |
| 5,005,464 | 4/1991 | Takaku | 91/376 R X |
| 5,910,880 | 5/1995 | Schluter | 60/547.1 |

FOREIGN PATENT DOCUMENTS

| | | |
|---|---|---|
| 0347583 | 12/1989 | European Pat. Off. . |
| 2021287 | 11/1970 | Germany . |
| 3112343 | 10/1982 | Germany . |

*Primary Examiner*—Hoang Nguyen
*Attorney, Agent, or Firm*—Leo H. McCormick, Jr.

[57] ABSTRACT

This boosted braking device comprises a pneumatic brake booster (1) associated with a master cylinder (2) and provided with an automatic control solenoid valve (26), this booster operating according to a mixed reaction principle and comprising a movable pneumatic piston (5) carrying a control valve (7) actuated by a rod (8), as well as a partition (4) which can be moved under the effect of a pressure difference, this movable wall (4) being mounted slidingly with respect to the pneumatic piston (5). The device of the invention makes it possible, with very few elements, to provide automatic braking without disturbing the normal operation of the booster.

3 Claims, 2 Drawing Sheets

BOOSTED BRAKING DEVICE WITH SIMPLIFIED AUTOMATIC CONTROL

The present invention relates to a boosted braking device for a motor vehicle comprising, on the one hand, a master cylinder filled with a braking fluid and equipped with a main hydraulic piston intended to receive an actuating force composed of an input force and of a boost force both acting in an axial direction and, on the other hand, a pneumatic booster suitable for exerting said actuating force on the main hydraulic piston and including a rigid casing separated by at least one sealed movable partition into at least two chambers the first of which at least is capable of being subjected selectively to a first pressure which is at least close to that which prevails in the second chamber, or to a second pressure which is different from the first one by means of at least one of two selective communication members comprising a solenoid valve and a valve controlled by the application of said input force on a control rod, said movable partition being capable of being forced by a pressure difference between the two chambers in order to entrain a pneumatic piston which can be moved with respect to the casing and carries said valve.

Devices of this type are known in the prior art and some examples thereof are given in documents EP-A2-0,171,588 and EP 0 347 583.

Such braking devices exhibit the potential interest, resulting from the use of a solenoid valve, of being capable of being actuated automatically by an electric signal without any intervention of the driver, for example in the event of detecting a situation requiring immediate braking of the vehicle or the wheels.

However, devices of this type up until now have known very few applications, essentially due to their cost still being too high and due to the reticence of users to see an automatic device depress the brake pedal in their place.

The present invention lies in this context, and its object is to propose a boosted braking device capable of being controlled automatically, but nevertheless of simple design, of low cost and respecting the usual reflexes of the users.

To this end, the device of the present invention is essentially characterized in that the main hydraulic piston of the master cylinder itself includes a hollow movable cylinder which communicates with the master cylinder, which interacts with the movable partition so as to receive at least a first part of the boost force communicated via the latter, and inside which there slides, in a sealed fashion and in the axial direction, a secondary hydraulic piston capable of receiving at least the said input force coming from the control rod, in that the movable partition is mounted slidingly on the pneumatic piston so as to be able to slide with respect to it over a predetermined stroke towards the master cylinder from an initial relative position in which it is in abutment against the pneumatic piston in a direction opposite to the one which points towards the master cylinder as far as a final position in which this movable partition may entrain the movable cylinder towards the master cylinder.

Moreover, it is possible to make provision for the valve to be forced closed by a spring and to isolate the two chambers from one another in the absence of an input force.

According to a preferred embodiment of the invention, the device further includes a reaction disk in contact with said pneumatic piston and suitable for transmitting to the secondary hydraulic piston a second part of the boost force coming from the pneumatic piston.

Other features and advantages of the invention will emerge clearly from the description thereof which is given hereafter, by way of non-limiting example, with reference to FIG. 1 which is a sectional view of a device in accordance with the invention, and to FIG. 2, which represents an enlarged detail of FIG. 1.

Insofar as the invention relates solely to an improvement made to pneumatic brake boosting systems and in which the general make-up and operation of the latter are well known to the person skilled in the art, these systems will be recalled but briefly here so as to allow a total understanding of the improvement which the invention represents.

Diagrammatically, a system of this type comprises a booster 1 and a master cylinder 2.

DETAILED DESCRIPTION OF THE DRAWINGS

Figure 1:
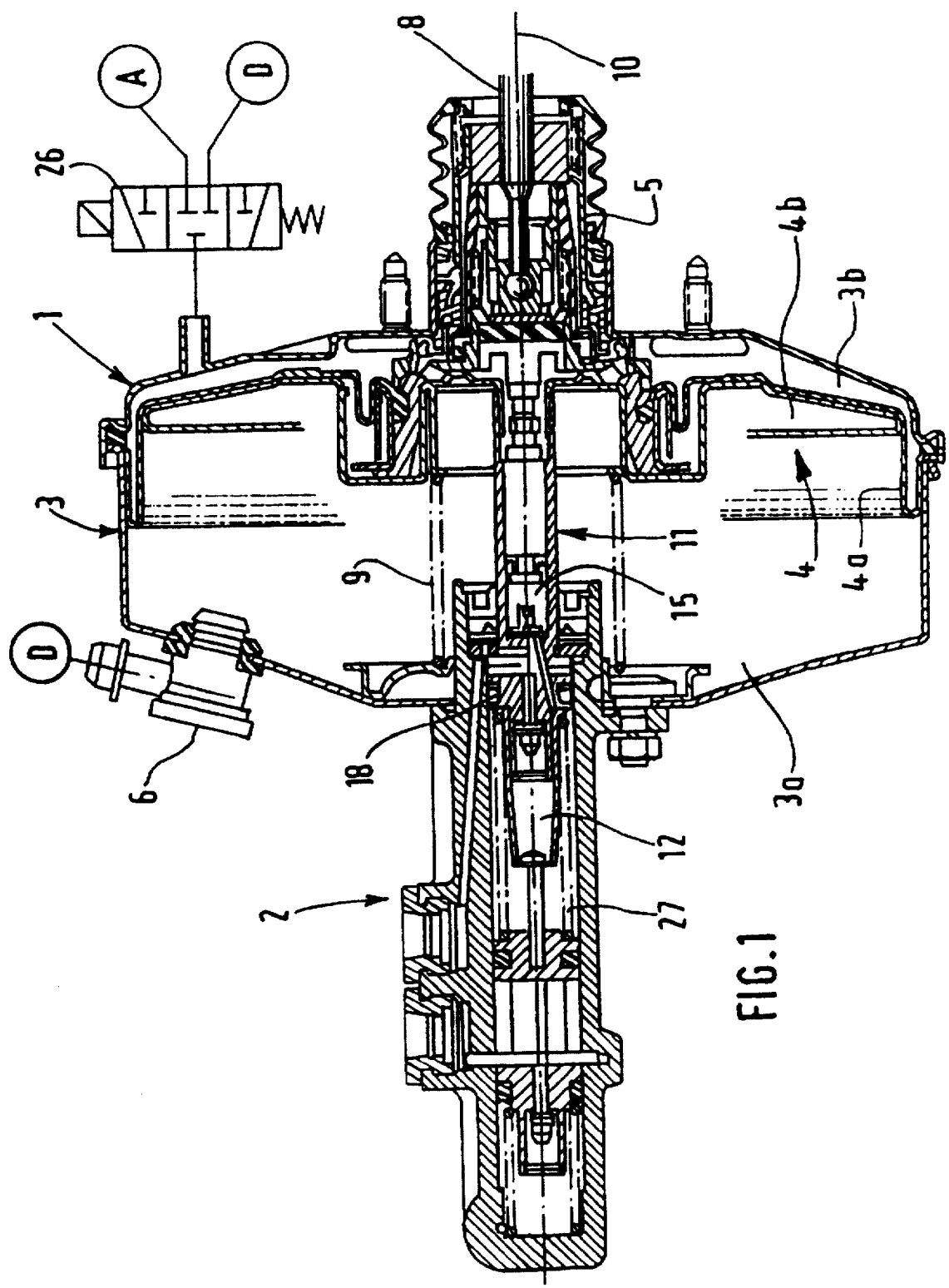
FIG. 1 is a sectional view of a device in accordance with the invention.

The booster itself comprises a rigid casing 3 divided into two chambers 3a and 3b in a sealed fashion by a movable partition 4 comprising a membrane 4a and a rigid skirt 4b and capable of entraining a pneumatic piston 5 which can move inside the casing 3.

The front chamber 3a whose front face is closed in a sealed fashion via the master cylinder 2 is permanently connected to a vacuum source D through a non-return valve 6.

Figure 2:
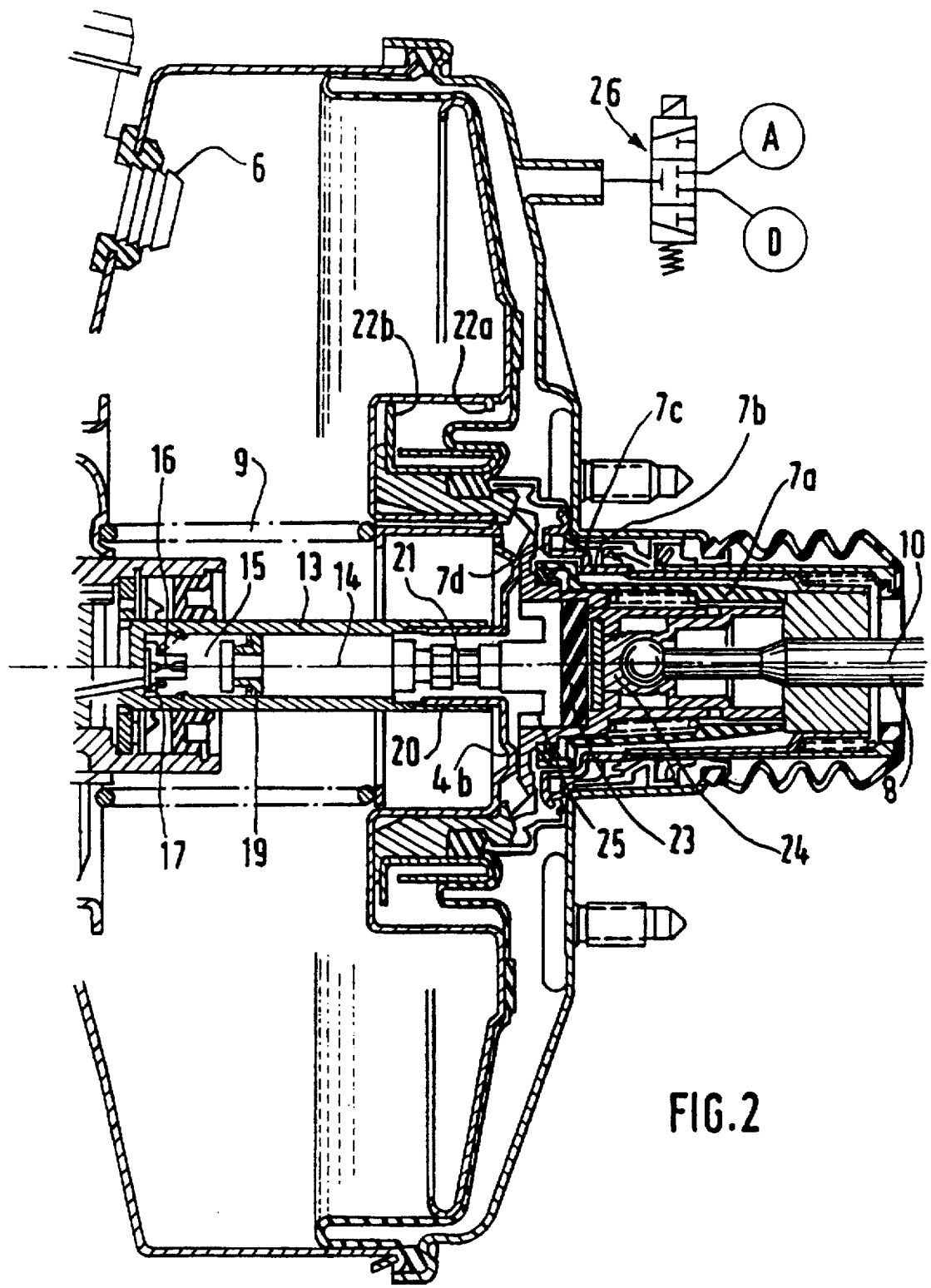
FIG. 2 represents an enlarged view of FIG. 1.

The pressure in the back chamber 3b is controlled by a valve 7 (FIG. 2) controlled by a control rod (8), which is connected to a brake pedal (not shown).

The valve 7, which is, for example, of the type described in document EP-A1-0,509,867, may be forced closed by at least one spring so as to isolate the two chambers 3a and 3b from one another for as long as the control rod receives no input force.

In this case, the valve 7 comprises a bush 7a, an annular support 7b and two annular sealing members 7c and 7d, the first sealing member 7c controlling the communication between the back chamber 3b and the atmosphere, and the second sealing member 7d controlling the communication between the two chambers 3a and 3b.

In the rest position of the booster, the annular support 7b is pushed back against the wall of the back chamber 3b (towards the right) by the pneumatic piston 5 which receives the force of a spring 9, and by the skirt 4b which receives the force of a spring 27 integrated into the master cylinder 2, the bush 7a itself being pushed back towards the right against the annular sealing member 7c, which it closes.

Under these conditions, the second sealing member 7d is itself applied against the pneumatic piston 5, in a position for which it prevents the communication between the chambers 3a and 3b.

When the control rod 8 is in the rest position, in this case pulled towards the right, and in spite of the fact that the chambers 3a and 3b no longer communicate, the valve 7 comes from a state in which it established communication between the two chambers 3a and 3b of the booster, so that the pressures prevailing in these chambers are equal or very close.

The back chamber 3b thus being subjected to the same vacuum D as the front chamber 3a, the piston 5 is pushed back towards the right, in the rest position, by the spring 9.

In this state of the booster, actuating the control rod 8 towards the left has the effect of moving the valve 7 so that it opens the back chamber 3b to atmospheric pressure.

The pressure difference between the two chambers, thus observed by the membrane 4a, exerts on the movable partition 4 a thrust which tends to move it towards the left and allow it normally to entrain the piston 5 which in turn moves compressing the spring 9.

The braking force exerted on the control rod 8, or "input force" and the brake boosting force, or "boost force", resulting from the thrust of the movable partition 4, are therefore applied together along the axis 10 of the thrust rod 8 towards the master cylinder 2, and join together so as to constitute the actuating force of the latter.

More precisely, the actuating force is applied to the main hydraulic piston 11 of the master cylinder and causes it to move towards the left (in the figure), which entrains an increase in pressure of the brake liquid present in the internal volume 12 of the master cylinder, and an actuation of the brake connected to the latter.

In the case of the invention, the main hydraulic piston 11 is, in fact, composite and comprises, on the one hand, the movable and hollow cylinder 13 already mentioned and, on the other hand, a secondary hydraulic piston 14.

The internal volume 15 of the movable cylinder 13 communicates with the internal volume 12 of the master cylinder by means of at least one orifice, such as 16, made in the movable cylinder in an axial direction, and of at least one non-return valve, such as 17, allowing brake fluid to flow only coming from inside 12 the master cylinder to inside 15 the movable cylinder 13.

Aside from the passage of fluid which the passage 16 and the valve 17 allow between the internal volume 12 of the master cylinder 2 and that of the movable cylinder 13, this movable cylinder 13 slides in a sealed fashion in the master cylinder 2, sealing being obtained by virtue of at least one annular seal 18.

The secondary hydraulic piston 14, for its part, slides inside the movable cylinder 13, which it seals in a sealed fashion by virtue of an annular seal 19.

The movable cylinder 13 is connected, via a link 20, to the rigid skirt 4b so as to receive a part of the boost force exerted by means of this skirt.

The secondary hydraulic piston 14 is, in fact, made up of the axial extension of a thrust rod 21 capable of transmitting to it, on the one hand, the input force exerted on the control rod 8 and, on the other hand, a fraction of the boost force developed by the pneumatic piston 5, these forces being transmitted, in a way known per se, by means of a reaction disk 23 on one face of which there bear this pneumatic piston and a feeler 24 actuated by the control rod and whose other face bears on a cup 25 integral with the thrust rod 21.

The operation of the device described up until now is as follows.

When an input force is applied to the control rod 8, the secondary hydraulic piston 14 is forced to the left, tending to increase the pressure in the master cylinder.

After a predetermined stroke of the thrust rod 8, the valve 7 opens to the atmosphere the back chamber 3b of the booster, which chamber was previously isolated from the front chamber 3a, and a boost force is applied to the movable cylinder 13 by the rigid skirt 4b.

The hydraulic pressure in the internal volume 12 of the master cylinder rises distinctly and becomes established, by the flow of hydraulic fluid through the passage 16 and the non-return valve 17, in the internal volume 15 of the movable cylinder, thus making there appear, on the secondary hydraulic piston 14, a reaction force which is dependent on the boost force, opposing the force transmitted via the reaction disk 23, and making it possible for the input force to control the boost force.

According to one feature of the invention, the movable partition 4 is, preferably by means of its rigid skirt 4b, mounted slidingly on the pneumatic piston 5 and may slide with respect to it towards the master cylinder 2.

More precisely, the relative sliding takes place from a rest position corresponding to the rest position of the booster, such as represented in FIG. 1 and in which the skirt 4b comes into abutment against the pneumatic piston 5 under the effect at least of the return spring 27 of the master cylinder 2 in a direction opposite the one which points towards the master cylinder 2, as far as a position in which the skirt 4b entrains the pneumatic piston 5 towards the master cylinder.

In order to do this, the skirt 4b and the pneumatic piston 5 have, for example, respective stop-pieces 22a, 22b facing one another, allowing the skirt 4b to entrain the pneumatic piston 5 only after a predetermined stroke corresponding to the distance separating these stop-pieces at rest.

Moreover, the booster comprises an at least two-way solenoid valve 26 making it possible to connect the back chamber 3b of the booster to atmospheric pressure at least.

Preferably, as shown, the solenoid valve 26 is a three-way solenoid valve making it possible to connect the back chamber 3b selectively either to the vacuum source D or to the atmosphere A.

By virtue of these features, the solenoid valve 26 may connect directly to [sic] the back chamber to the atmosphere and give rise to automatic braking, without there being a need to provide specific means for retaining, moreover, normal operation of the booster, without the appearance of automatic braking being conditioned by a prior braking action by the driver, and without the brake pedal undergoing any troublesome movement, because the movement of the skirt gives rise to braking before the pneumatic piston 5, to which the pedal is connected via the control rod 8, is entrained.

After an automatic braking action, the solenoid valve 26 is preferably controlled so as to connect the back chamber 3b to the vacuum source, and thus to re-establish the situation prior to braking.

We claim:

1. A brake booster device for a motor vehicle comprising:
   a master cylinder filled with a brake fluid and equipped with a main hydraulic piston for receiving an actuating force composed of an input force and of a boost force both acting in an axial direction and a pneumatic booster for exerting said actuating force on the main hydraulic piston, said pneumatic booster having a rigid casing separated by at least one sealed movable partition into at least first and second chambers, said second chamber being connected selectively by virtue of at least one of two selective communication members comprising a solenoid valve and a valve controlled by the application of said input force on a control rod to first and second pressure sources delivering first and second respective pressures, said first chamber being connected to receive said second pressure source to receive said second pressure, said movable partition being moved by a pressure difference between said first and second chambers in order to entrain a pneumatic piston which is moved with respect to said rigid casing and carries said valve, characterised in that said main hydraulic piston of the master cylinder includes a hollow movable cylinder which communicates with the master cylinder and which interacts with said movable partition to receive at least a first part of said boost force communicated received by said movable partition, a secondary hydraulic piston located in said hollow movable cylinder and movable in an axial direction in response to said input force coming from the control rod, said movable partition being mounted slidingly on the pneumatic piston and slidable with respect to said movable partition in response to a predetermined force applied to said control rod towards said master cylinder from an initial relative position in abutment against said pneumatic piston and a final position as said movable partition moves towards the master cylinder.

2. The brake booster device according to claim 1, characterised in that said valve is moved to a closed position by a spring to isolates said first and second chambers from each another in the absence of said input force.

3. The brake booster device according to claim 1 or 2, further characterised by a reaction disk which contacts said pneumatic piston and transmits a second part of the boost force coming from the pneumatic piston to said secondary hydraulic piston.

* * * * *